No. 893,168. PATENTED JULY 14, 1908.
I. HEWITT.
CEMENT SPREADING MACHINE.
APPLICATION FILED APR. 25, 1907. RENEWED MAR. 13, 1908.

Witnesses:
Jas. E. Hutchinson
John T. Schrott

Inventor:
Isaac Hewitt.
By Fred G. Dieterich
Attorneys.

UNITED STATES PATENT OFFICE.

ISAAC HEWITT, OF VICTORIA, BRITISH COLUMBIA, CANADA.

CEMENT-SPREADING MACHINE.

No. 893,168.          Specification of Letters Patent.          Patented July 14, 1908.

Application filed April 25, 1907, Serial No. 370,221. Renewed March 13, 1908. Serial No. 420,881.

*To all whom it may concern:*

Be it known that I, ISAAC HEWITT, citizen of the Dominion of Canada, residing at Victoria, in the Province of British Columbia, Canada, have invented a new and useful Improvement in Cement - Spreading Machines, of which the following is a specification.

This invention relates to a machine designed for spreading and surfacing cement over a flat horizontal surface such as a sidewalk.

Figure 1:
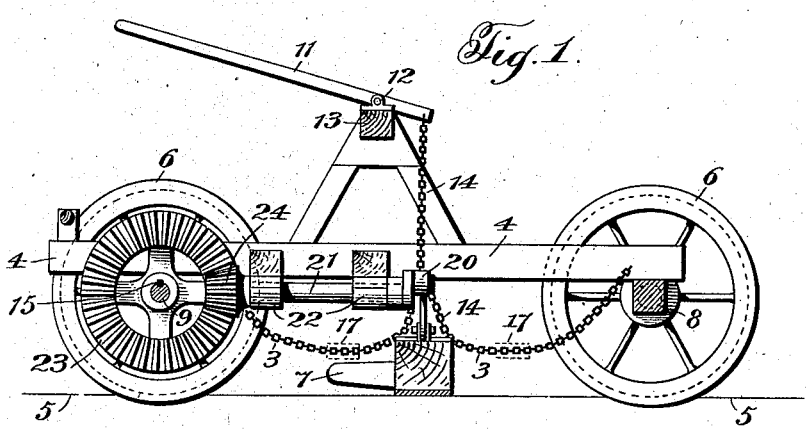
Figure 2:
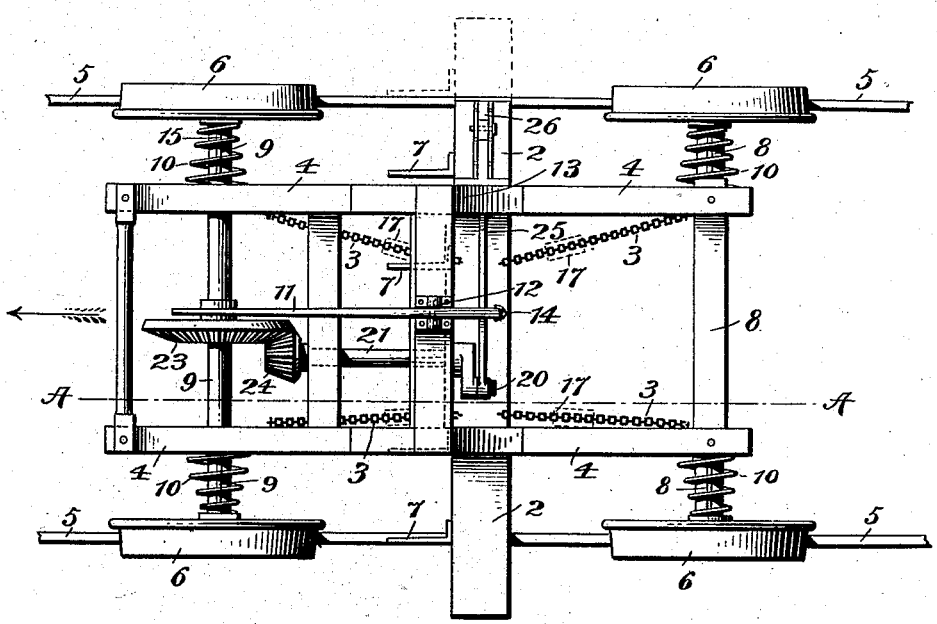

The machine is fully described in the following specification reference being made to the drawings by which it is accompanied, in which:

Figure 1 is a longitudinal section through the machine on the line A A in Fig. 2, and Fig. 2, a plan of the machine.

The essential feature of the machine consists of a heavy drag beam 2 loosely hung by means of chains 3 from a truck frame 4 carried by flanged wheels 6 on a light track of any suitable character such as the curb-boards 5 which limit the width of the sidewalk or section over which it is desired the cement shall be spread. When I speak of the drag beam 2 being "loosely hung" etc. I desire this expression understood to mean any suspension of the drag beam whereby the same will be relatively loose as contradistinguished from 1 being held in a stationary bearing frame.

The drag beam 2 may be shod with metal on its under side and is furnished on the forward side with projecting spreader members 7. The spreader members 7 serve, as the beam 2 is moved from side to side, to spread the material evenly over the course. It is loosely hung from the frame 4 in such a manner that the full weight of the drag beam will rest on the curb-boards 5 of the surface over which it is moved and that will permit of the drag beam being laterally reciprocated by a mechanism to be described as the truck frame 4 is so moved.

A lever 11 pivotally mounted at 12 on a frame 13 on the truck frame 4 is connected by a chain 14 to the drag beam 2, by which the drag beam may be lifted clear of the surface when desired.

The wheels 6 of the truck frame are endwise movable on their axles 8 and 9 so that the gage of the wheel flanges may be varied to suit varying widths of sidewalk and the wheels are pressed to the outer limit of such endwise movement by light springs 10 between the hubs of the wheels and the adjacent side frame of the truck. One of the axles 8 is fixed and its wheels rotate on its ends but the other 9 is rotatable in bearings in the truck frame and its wheels are secured against rotation on it by means of feathers 15 which will allow the wheels to move endwise on the axle while rotating the axle as the machine is moved forward on its wheels. The object of this is to provide the means for effecting the lateral reciprocation of the drag beam from the axle 9 as the machine is moved backward or forward on the tracks. This lateral reciprocation is effected by a crank pin 20 secured on the end of a short shaft 21 supported in bearings 22 from the truck frame, and this shaft 21 is rotated by a bevel wheel 23 secured on the axle 9 and meshing with a pinion 24 secured on the shaft 21. A rod 25 connects the crank pin 20 with an attachment 26 secured to the drag beam the attachment 26 being provided with a series of pin holes so that the rod 25 may be connected at different distances from the end of the beam 2 so as to cause the same to reciprocate unevenly and be projected a greater distance at one side of the track than at the other during reciprocation, as conditions may require, as for instance where it is necessary to make house connections to the side - walk. In other words the rod 25 may be adjustably connected to the beam 2 by having its connecting pin inserted in any of the pin apertures of the member 26 to throw the beam 2 to one side or the other of the central line of draft of the truck.

Means may be provided whereby the weight of the drag beam on the surface over which it is designed to operate may be varied. This may be done either by adding weight to the beam itself or preferably by hanging weights 17 on the chains 3 as shown by dot and dash lines in the figures.

In the operation of the machine the cement mixture being delivered in front of it, the machine is pulled or otherwise moved forward in the direction of the arrow, the lateral reciprocation of the beam 2 will, by means of the forwardly projecting members 7, distribute the cement over the desired width and the passage of the heavy drag beam over the distributed cement will surface it smooth to the level of the curb-boards on which its weight rests. The loose manner in which the beam is connected by the chains 3 to the truck frame 4 while permitting free reciprocation of the beam does not confine it to rigid lines of movement. When a sidewalk connection is to be made the point of attachment of the rod 25 to the beam 2 may be shifted to throw the beam laterally toward the connection.

Having now particularly described my invention and the manner of its use I hereby declare that what I claim as new and desire to be protected in by Letters Patent is:

1. In a cement spreading machine, a drag beam loosely suspended from a wheeled frame and means for laterally reciprocating said drag beam.

2. In a cement spreading machine, a drag beam loosely suspended from a wheeled carriage, members forwardly projecting from said drag beam, and means for laterally reciprocating the drag beam.

3. In a cement spreading machine, a drag beam loosely suspended from a wheeled frame and means for laterally reciprocating the drag beam by the forward movement of the wheeled frame.

4. In a cement spreading machine, a drag beam loosely suspended athwart a wheeled frame, members forwardly projecting from such drag beam, means for laterally reciprocating the drag beam from the axle of one of the carrying wheels, and means for lifting the drag beam.

5. In a cement spreading machine, a drag beam loosely suspended from a wheeled frame, means for laterally reciprocating said drag beam, and means for throwing such lateral reciprocation to one side or the other of the middle line of movement of the wheeled frame.

6. In a cement spreading machine, the drag beam 2 suspended by chains 3 from the wheeled frame 4, the axles 8 and 9 on which the wheels are endwise movable, the springs 10 checking such movement, the feather 15 by which the axle 9 is rotatable with its wheels, the shaft 21, the gears 23 24, rotating said shaft the crank 20, connecting rod 25 by which the beam 2 is laterally reciprocated, the lever 11 and chain 14 by which said beam is lifted.

7. In a cement spreading machine, a drag beam loosely suspended from a wheeled frame, and means adjustably connected with the beam for laterally reciprocating the drag beam, substantially as shown and described.

8. In a cement spreading machine, a drag beam loosely suspended from a wheeled frame, and means adjustably connected with the drag beam for laterally reciprocating the drag beam by the forward movement of the wheeled frame, substantially as shown and described.

In testimony whereof I have signed my name to this specification in the presence of two subscribing witnesses.

ISAAC HEWITT.

Witnesses:
ROWLAND BRITTAIN,
CLIVE S. CARMAN.